(No Model.)

L. S. BROWN.
ASH SIFTING SHOVEL.

No. 281,012. Patented July 10, 1883.

United States Patent Office.

LEANDER S. BROWN, OF SHARPSBURG, PENNSYLVANIA.

ASH-SIFTING SHOVEL.

SPECIFICATION forming part of Letters Patent No. 281,012, dated July 10, 1883.

Application filed January 8, 1883. (No model.)

*To all whom it may concern:*

Be it known that I, LEANDER S. BROWN, a citizen of the United States, residing at Sharpsburg, in the county of Allegheny and State of Pennsylvania, have invented a certain new and useful Improvement in Ash-Sifting Shovels; and I do hereby declare the following to be a full, clear, and exact description thereof.

Figure 1:
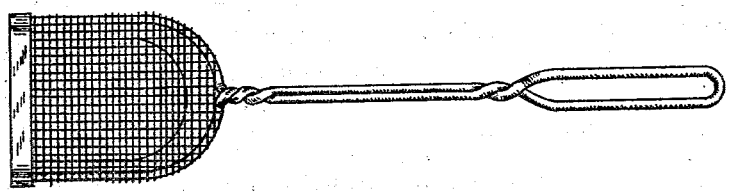
Figure 2:
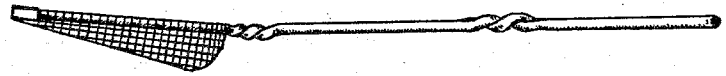

Figure 1 is a plan view of my improved ash-sifting shovel. Fig. 2 is a side view of same.

The object of this invention is to produce an ash-sifting shovel for domestic use which will be light, cheap, and durable, and by the use of which the ashes may be rapidly and effectively sifted and all the unburned coal returned to the fire. This object and advantages I secure by making the handle and shovel-frame of one piece of wire, bent, shaped, and twisted by machinery, thus producing a cheap, light, and elegant handle and frame. The blade is made of wire-cloth, cut into shape and woven onto the handle by machinery. The lip is made of sheet metal punched and bent to shape and pressed onto the front of the wire-cloth and around the wire handle. The whole shovel is then put under a drop or press and the bowl of the shovel formed and the handle bent to proper shape.

In the manufacture of these ash-shovels there is no wood, rivets, or solder employed, the handle will never get loose, the lip on the front is double, and so pressed between the meshes of the wire-cloth as to be stiff, firm, and durable, and as the entire bowl of the shovel is a sieve ashes may be rapidly and thoroughly sifted and the unburned coals returned to the fire, which will be a great saving of fuel and a blessing to the poor.

The material of which these shovels are constructed may be previously galvanized; but I prefer to first finish the shovels and then galvanize them or coat them with some other non-oxidizing metal.

What I claim, and desire to secure by Letters Patent, is—

As a new article of manufacture, an ash-sifting shovel composed entirely of metal, and consisting of a frame and handle constructed of a single wire, a woven-wire blade, and a sheet-metal tip, substantially as and for the purposes described.

LEANDER S. BROWN.

Witnesses:
JAMES H. PORTE,
WALTER REESE.